United States Patent [19]

Ehrich

[11] Patent Number: 4,776,789
[45] Date of Patent: Oct. 11, 1988

[54] CONVEYOR TRANSFER ASSEMBLY

[75] Inventor: Christel R. Ehrich, Irving, Tex.

[73] Assignee: Frito-Lay, Inc., Dallas, Tex.

[21] Appl. No.: 944,209

[22] Filed: Dec. 22, 1986

[51] Int. Cl.$^4$ .......................... F27B 9/02; F27D 23/00
[52] U.S. Cl. .................................... 432/129; 432/194; 432/249
[58] Field of Search ............... 432/121, 249, 239, 124, 432/129, 132, 140, 148, 194

[56] References Cited

U.S. PATENT DOCUMENTS

| | | | |
|---|---|---|---|
| 2,112,309 | 3/1938 | Santillan | 53/5 |
| 3,115,084 | 12/1963 | Anetsberger et al. | 99/403 |
| 3,718,323 | 2/1973 | Ulbrich | 432/194 |
| 4,035,142 | 7/1977 | Hatzenbichler | 432/249 |
| 4,309,938 | 1/1982 | Harmon | 99/477 |
| 4,508,025 | 4/1985 | Schultz | 99/353 |
| 4,512,737 | 4/1985 | Pierce | 432/194 |
| 4,548,191 | 10/1985 | Hwang | 432/129 |
| 4,608,014 | 8/1986 | Buchegger et al. | 432/249 |

OTHER PUBLICATIONS

1981 Carborundum Company Brochure.

Primary Examiner—Henry C. Yuen
Attorney, Agent, or Firm—Bernard, Rothwell & Brown

[57] ABSTRACT

A device for transferring a food piece from an upper conveyor to a lower conveyor in an oven includes a slide having a first curved sheet with a continuous transfer surface for guiding a food piece between upper and lower conveyors while reversing the direction of and inverting the food piece. The slide includes a second curved sheet which together with the first curved sheet forms a unitary structure with an insulating layer between the first and second curved sheets. The slide is supported by track followers on a pair of parallel tracks. Also supported on the tracks is a heat shield separating the slide from outside the oven, the heat shield being connected to the slide by the track followers. The slide and heat shield are simultaneously displaceable along the tracks between a transfer position wherein the slide is intermediate to the upper and lower belts for transferring articles between the belts, and a position wherein access is provided to the slide from outside the oven.

4 Claims, 3 Drawing Sheets

CONVEYOR TRANSFER ASSEMBLY

BACKGROUND OF THE INVENTION

1. Field of the Invention

The present invention relates to an oven assembly containing vertically arranged, horizontally conveying endless conveyor belts, and to a device for transferring food articles from upper to lower conveyors while inverting the food articles and reversing their direction.

2. Description of the Background Art

Commercial production of certain baked goods, such as tortilla chips, advantageously utilizes pass-through ovens through which the article to be baked is conveyed in a continuous process. To minimize the amount of floor space occupied by a pass-through oven, the oven can be provided with a vertical array of horizontally operating conveyors, with the food article being sequentially passed from upper to lower conveyors while being baked.

For example, U.S. Pat. No. 4,508,025 to Schultz discloses a tortilla press and oven unit including a plurality of horizontally rotating, vertically arranged conveyor discs between which are located fixed curved slides for inverting tortillas while transferring them to a lower adjacent disc in the oven.

A different type of transfer device is shown in U.S. Pat. No. 4,309,938 to Harmon. The Harmon patent discloses a smoker including curved guides for forming end portions of conveyor belts into arcuate shapes for inverting food pieces while transferring them from upper to lower belts.

U.S. Pat. No. 3,115,084 to Anetsberger et al. discloses belt conveyors in a dough proofer with vertically corrugated guide plates between adjacent, vertically arranged conveyor belts. The guide plates slidingly redirect movement of a dough piece to reverse the direction of the dough piece onto a lower conveyor belt.

U.S. Pat. No. 2,112,309 to Santillan discloses a tortilla grill with adjacent, vertically arranged, horizontal endless conveyor belts traveling in opposite directions. A moving inclined belt is provided for transferring soft tortillas between conveyors in the upper portion of the grill, and a simple inclined slide is provided down the line for conveying grilled tortillas between conveyor belts.

Commercial ovens are available from Electra Foods Machinery (EFM), of Del Monte, Calif., that include vertically arranged, horizontal endless conveyor belts with adjacent belts traveling in opposite directions. Food pieces are transferred from an upper belt to a lower belt by an array of 32 curved hollow fingers that transfer the food articles between the belts while reversing their direction and inverting the articles. When baking tortilla chips, the curved, hollow fingers of the EFM oven have been found to expand unevenly, causing chips to sometimes fold over during transfer. The chips also tend to stick to the transfer device and build up, requiring an oven shut-down to allow cleaning of the device. Because of the intense heat from the oven in the vicinity of the curved fingers, cleaning is difficult and can cause operator injury. The oven is provided with a back heat shield, which must be removed to provide access to the curved fingers of the transfer device. Because the oven back heat shield attaches to the oven frame with bolts, it is difficult to remove and as a consequence, often is left off during oven use to provide access to the curved fingers of the transfer device.

There remains a need in the art for a conveyor transfer device that reduces product sticking and buildup, and provides easy access thereto with a heat shield in place.

SUMMARY OF THE INVENTION

In accordance with the present invention, an oven with a conveyor transfer assembly includes a support framework that supports oven wall portions defining an oven interior. The wall portions include an access opening to the oven interior and a heat shield covering at least a portion of the access opening. The assembly includes a first conveyor comprised of an endless belt having a substantially horizontal top surface for horizontally conveying an article in a first direction towards a discharge end of the first conveyor in the vicinity of the heat shield. A second conveyor is provided which is comprised of a second endless belt positioned below the first conveyor. The second belt has a substantially horizontal top surface for horizontally conveying an article in a second direction substantially opposite the first direction. The top surface of the second belt has a receiving end below the discharge end of the first conveyor. A slide is disposed between the first conveyor and the heat shield, the slide including a first curved sheet having a continuous transfer surface for guiding an article from the discharge end of the first conveyor to the receiving end of the top surface of the second belt. In a transfer position, the transfer surface of the slide is intermediate to the first belt and the second belt, and inverts an article during transfer of the article from the first belt to the second belt. The slide includes a second curved sheet disposed between the first curved sheet and the heat shield. The first and second curved sheets have opposing surfaces between which is located a thermally insulating layer. A slide and heat shield support is connected to the support framework for supporting the slide in the transfer position and for supporting the heat shield. The slide and heat shield support allows displacement of the heat shield and the slide to move the slide from the transfer position to an access position through the access opening, while supporting the heat shield and the slide.

DETAILED DESCRIPTION OF THE PREFERRED EMBODIMENT

Figure 3:
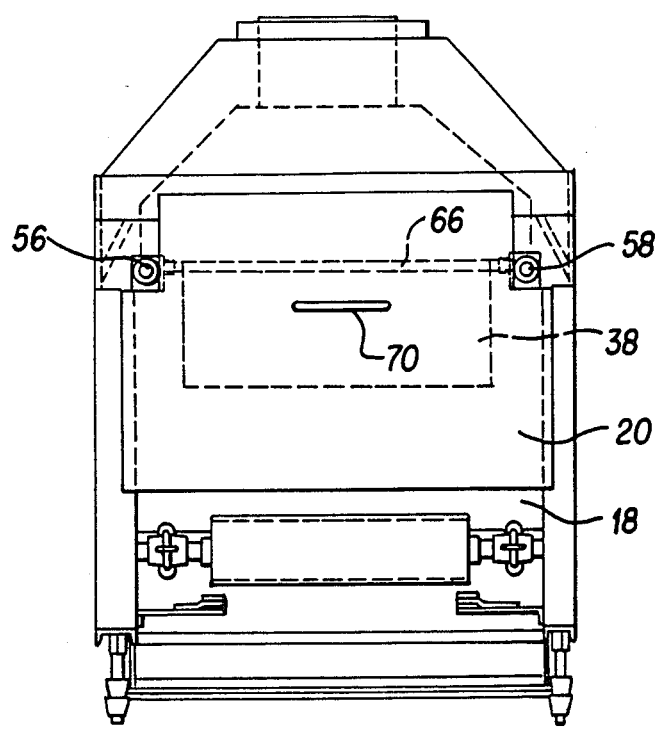
FIG. 3 is a rear elevation view of a conveyor transfer assembly according to the invention, installed in an oven.

The present invention provides a device for transferring food pieces between adjacent vertically arranged horizontal conveyors in an oven. In accordance with the invention, an oven 10 includes a framework 12 supporting oven wall portions 14 defining an oven interior 16 and an access opening 18 to the oven interior. See FIGS. 1 and 3. A heat shield 20 covers at least a portion of the access opening 18.

Oven 10 includes a first conveyor comprised of an endless belt 22 having a substantially horizontal top surface 24 for horizontally conveying an article, such as a tortilla chip T, in a first direction indicated by arrow 26, towards a discharge end 28 of conveyor 22 in the vicinity of heat shield 20. See FIGS. 1 and 4.

Oven 10 further includes a second conveyor comprised of a second endless belt 30 positioned below first conveyor 22 and including a substantially horizontal top surface 32. Top surface 32 of belt 30 horizontally conveys articles such as tortilla chips T in a second direction indicated by arrow 34, opposite the direction of arrow 26. The top surface 32 of belt 30 includes a receiving end 36 below the discharge end 28 of the first belt 22.

A slide 38 separates the first conveyor 22 from the heat shield 20. The slide includes a first curved sheet 40 having a continuous transfer surface 42 for guiding an article from the discharge end 28 of the first belt 22 to the receiving end 36 of the top surface 32 of belt 30. See FIGS. 2 and 4. The transfer surface 42 of slide 38 is intermediate to the first conveyor 22 and the second conveyor 30 in a transfer position, and inverts an article during transfer of the article from the first belt 22 to the second conveyor belt 30.

Slide 38 includes a second curved sheet 44, which together with the first curved sheet 40 forms a unitary structure with an insulating layer 46 sandwiched between the first and second sheets. The heat insulating layer 46 is positioned between opposing surfaces of the first and second curved sheets. The insulating layer can be a dead air space, a layer of insulating material, or even a vacuum. Suitable insulating materials generally have thermal conductivities of less than about 0.15 W/m ° C. at 427° C. (800° F.). One suitable material is Fiberfrax Durablanket ®, manufactured by the Carborundum Company, Niagara Falls, N. Y., U.S.A. Durablanket ® materials range in thickness from 6.4 mm to 102 mm (from $\frac{1}{4}$ inch to 4 inches), and preferably have densities within the range of from about 96–128 kg/m$^3$ (about 6–8 lb/ft$^3$)

Figure 2:
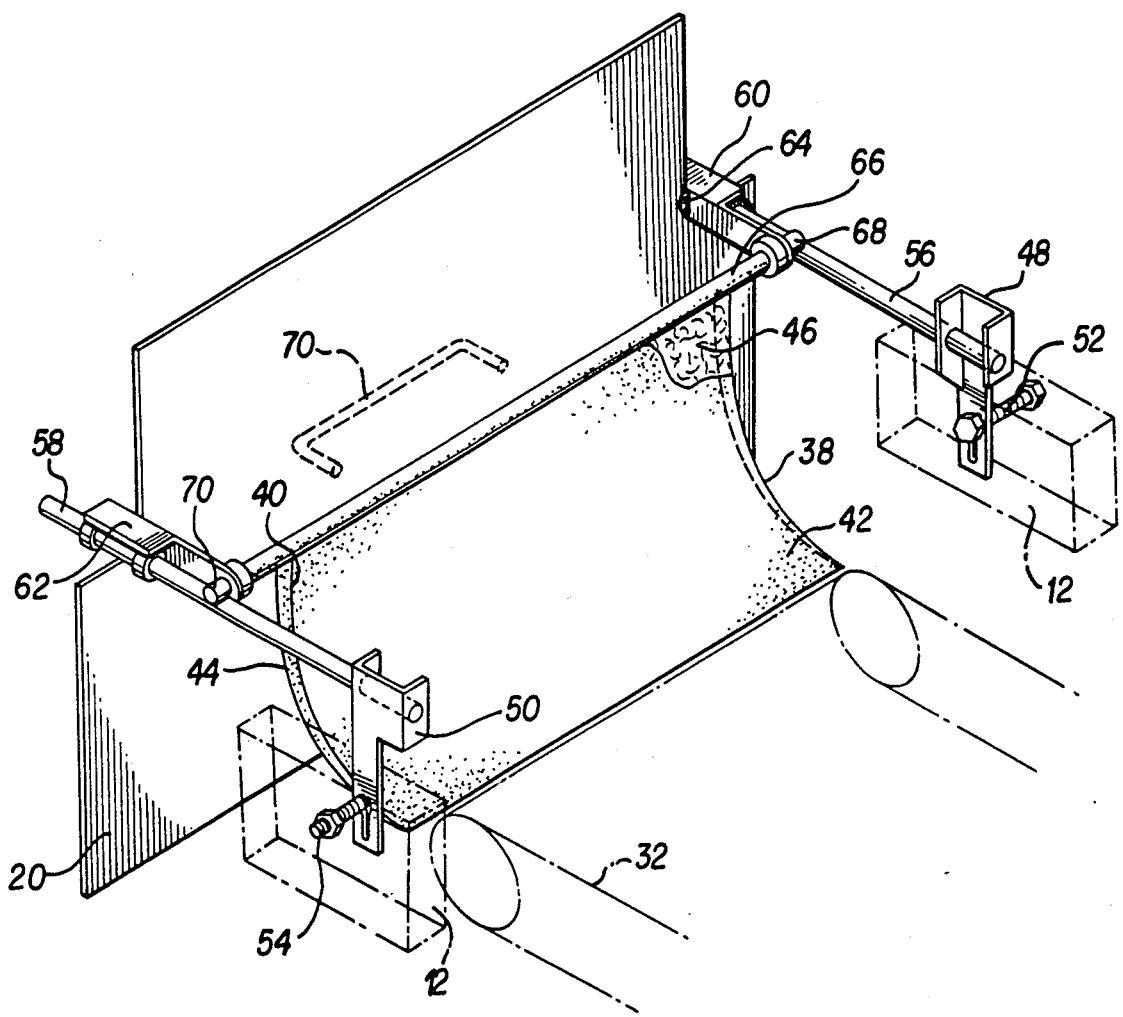
FIG. 2 is a perspective view, partly schematic, of a conveyor transfer assembly according to the invention, with a portion broken away, and with oven portions left out for clarity.

Means are connected to the support framework 12 for slidably supporting the slide 38 and heat shield 20. See FIG. 2. The slide supporting means includes side brackets 48 and 50 attached to support framework 12 by any suitable means, such as nut and bolt combinations 52 and 54 respectively. Attached to brackets 48 and 50 are parallel tracks in the form of shafts 56 and 58. Track followers 60 and 62 slidably receive shafts 56 and 58 respectively, and connect the heat shield 20 and the slide 38 for simultaneous movement of heat shield 20 and slide 38 along shafts 56 and 58. The heat shield 20 is attached to the track followers by any suitable means, such as by welding 64, one of which is shown in FIG. 2. Slide 38 is attached to track followers 60 and 62 by any suitable means such as by crossbar 66 integrally attached to slide 38. The ends 68 and 70 of crossbar 66 are supported within corresponding keeper openings in respective track followers 60 and 62, and are supported by and slidable along respective shafts 56 and 58.

Figure 4:
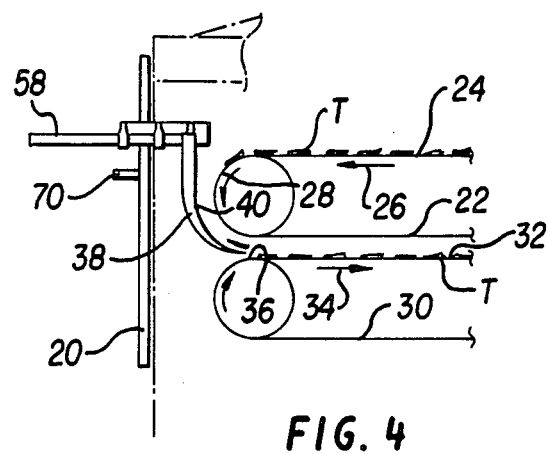
FIG. 4 is an elevation view, partly schematic, with oven portions left out for clarity, of a conveyor transfer assembly according to the invention, transferring tortilla chips between conveyors.

FIG. 4 shows the slide and heat shield assembly of the invention in use, with oven support structures and brackets for connecting thereto left out for clarity. Partially baked tortilla chips T are conveyed in the direction of arrow 26 on the upper surface 24 of conveyor belt 22. As the chips round the discharge end 28 of conveyor belt 22, the chips fall onto the transfer surface of the first curved sheet 40. The chips then slide down the transfer surface of sheet 40 and are inverted before being deposited onto the receiving end 36 of conveyor belt 30. Conveyor belt 30 then conveys the chips in the direction of arrow 34, opposite to the direction of arrow 26.

Figure 1:
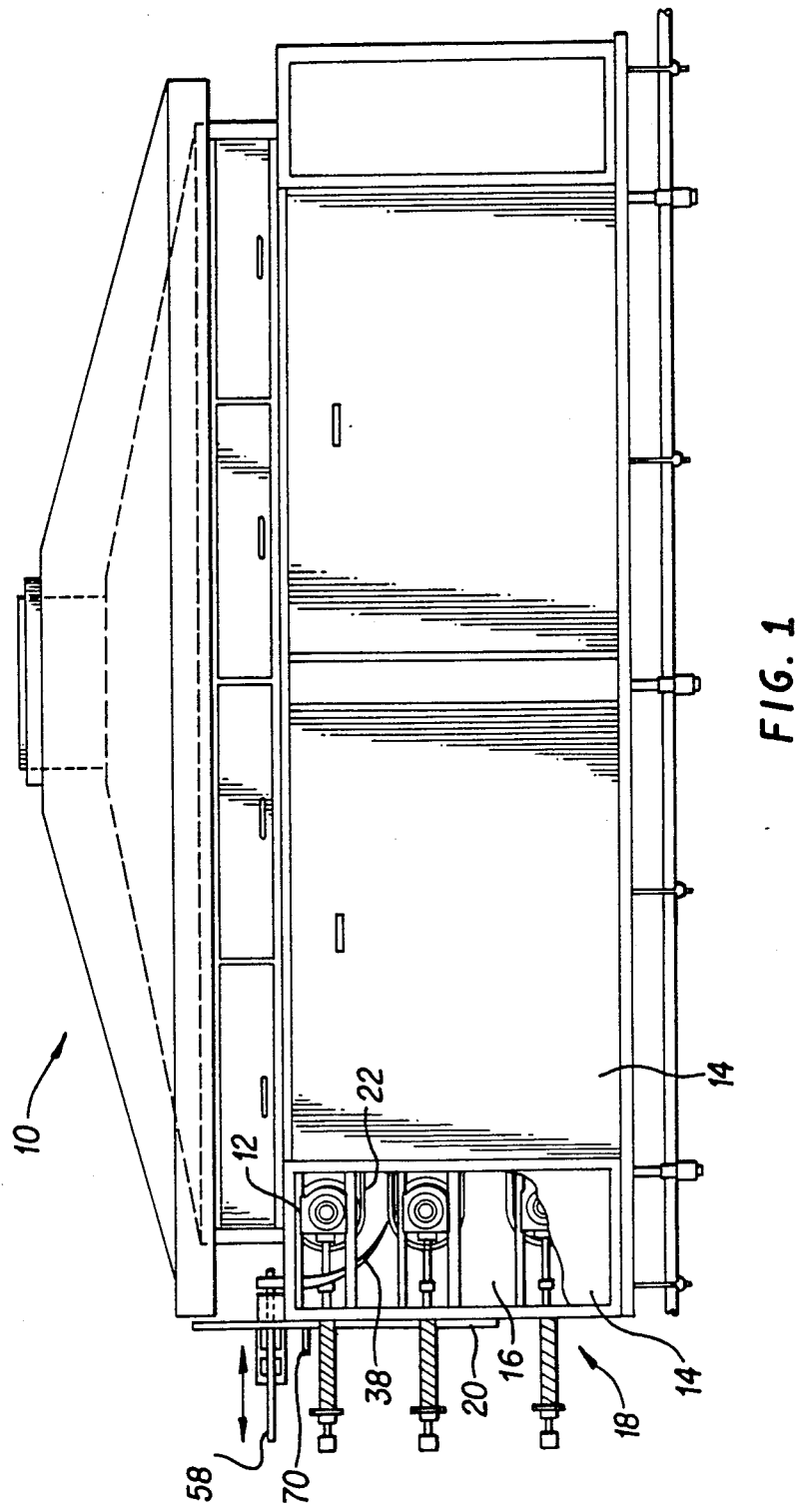
FIG. 1 is a side elevation view, with portions broken away, of a conveyor transfer assembly according to the invention, installed in an oven.

Heat shield 20 and slide 38 are simultaneously slidable along shafts 56 and 58 from the transfer position shown in FIGS. 1 and 4 with the heat shield at least partially covering access opening 18, to the position shown in FIG. 2 providing access to the slide from outside the oven with the heat shield and slide supported by shafts 56 and 58. A handle 70 is mounted on the outside surface of heat shield 20 for simultaneously displacing the heat shield and slide assembly along shafts 56 and 58.

The present invention provides a slide for transferring a product between conveyors in an oven while inverting the product The slide includes a doublewalled insulated plate to transfer the product, the insulated plate providing heat retention allowing tortilla chips and the like to slide easily on the surface of the plate to the next conveyor The heat shield is fixedly connected to the slide to protect an oven operator from heat that may escape from the oven. The slide nd heat shield are movable away from the oven on two shafts mounted to the oven, for easy inspection of the slide without dangerous exposure to heat, without handling tools and without lifting heavy and hot hardware.

Since many modifications, variations and changes in detail may be made to the described embodiment, it is intended that all matter in the foregoing description and shown in the accompanying drawings be interpreted as illustrative and not in a limiting sense.

What is claimed is:

1. An oven with a conveyor transfer assembly comprising:
    (a) a support framework supporting oven wall portions defining an oven interior and an access opening to to oven interior, and a heat shield covering at least a portion of the access opening;
    (b) a first conveyor comprised of an endless belt having a substantially horizontal top surface for horizontally conveying an article in a first direction towards a discharge end of the first conveyor in the vicinity of said heat shield;
    (c) a second conveyor comprised of a second endless belt positioned below the first conveyor, the second belt having a substantially horizontal top surface for horizontally conveying an article in a second direction substantially opposite the first direction, the top surface of the second belt having a receiving end below the discharge end of the first conveyor;
    (d) insulated slide means disposed between the first conveyor and the heat shield in a transfer position, the slide means including a first curved sheet having a continuous transfer surface for guiding an article from the discharge end of the first conveyor to the receiving end of the top surface of the second belt, the transfer surface of the slide being intermediate to said first belt and said second belt, the transfer surface inverting an article during transfer of the article from the first belt to the second belt, the slide means including a second curved sheet the first and second curved sheets having opposing surfaces between which surfaces is located a thermally insulating layer;

(e) means connected to the support framework for supporting the slide in the transfer position and for supporting the heat shield, the means supporting the slide and heat shield allowing displacement of the heat shield and the slide to move the slide from the transfer position to an access position through said access opening, while supporting the heat shield and the slide, wherein the slide supporting means is comprised of parallel track means connected to the support framework, and track follower means guided on and supported by the track means for providing access to the slide, the track follower means connecting the heat shield and the slide for simultaneous movement of the heat shield and the slide.

2. The oven assembly of claim 1 wherein the first and second curved sheets form a unitary structure with an insulating layer of material sandwiched between the first and second sheets.

3. The oven assembly of claim 1 further including a handle attached to an outer surface of the heat shield for displacing the heat shield and slide along the track means.

4. The oven assembly of claim 1 wherein the insulating layer has a thermal conductivity of less than about 0.15 W/m ° C. at 427° (800° F.).

* * * * *

UNITED STATES PATENT AND TRADEMARK OFFICE
CERTIFICATE OF CORRECTION

PATENT NO. : 4,776,789

DATED : October 11, 1988

INVENTOR(S) : Christel R. Ehrich

It is certified that error appears in the above-identified patent and that said Letters Patent is hereby corrected as shown below:

Column 4, line 21, after "product" insert a period (--.--);

Column 4, line 27, delete "nd" and insert --and--;

Column 6, line 14, after "427°" insert --C.--.

Signed and Sealed this

Twenty-third Day of May, 1989

Attest:

DONALD J. QUIGG

Attesting Officer

Commissioner of Patents and Trademarks